June 19, 1951 — L. A. STE. MARIE — 2,557,846
SERVING IMPLEMENT
Filed Oct. 17, 1947
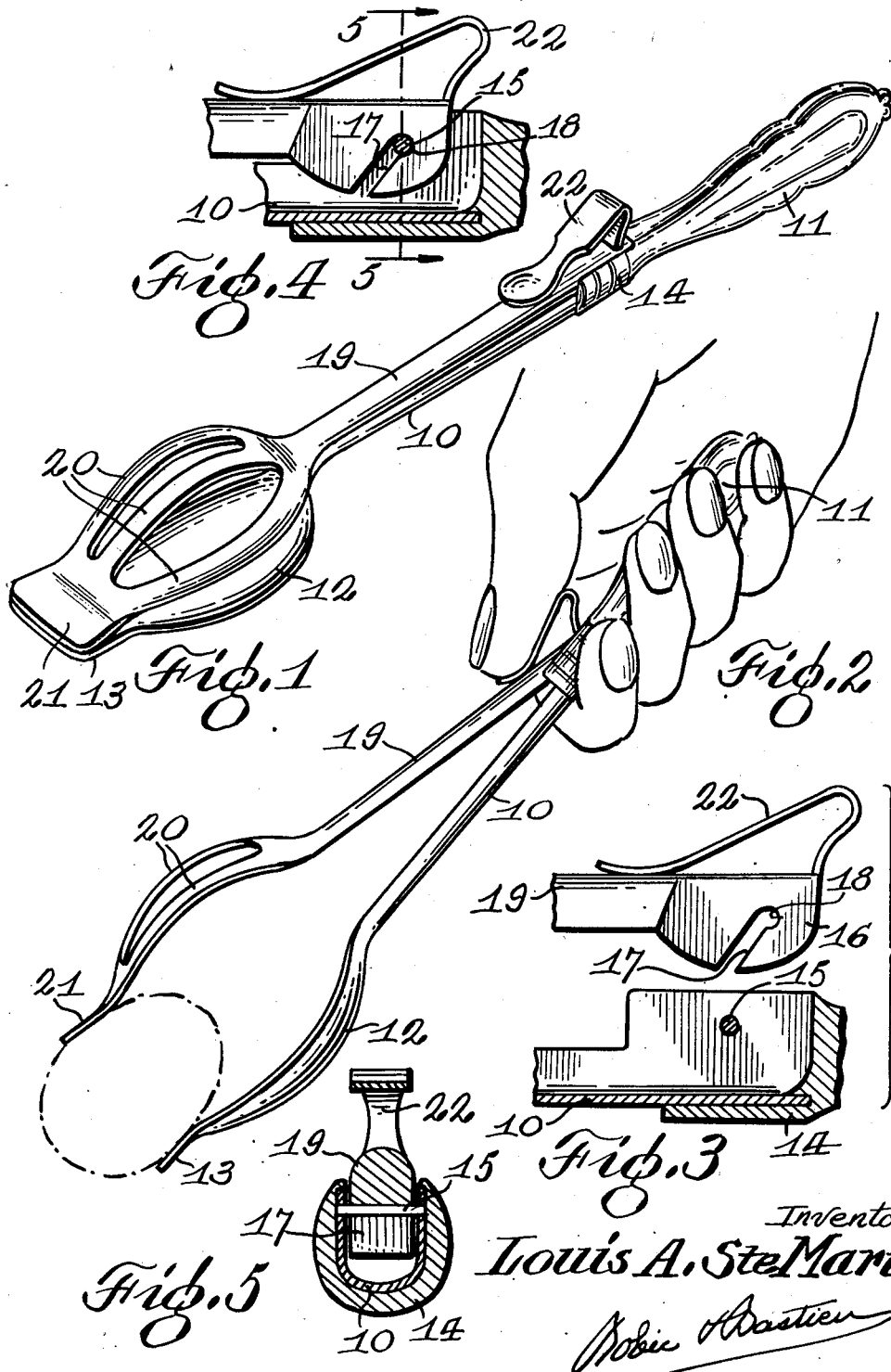
Inventor
Louis A. Ste Marie
By
Attorneys Patented June 19, 1951

2,557,846

UNITED STATES PATENT OFFICE 2,557,846

SERVING IMPLEMENT

Louis Alexandre Ste. Marie, Montreal, Quebec, Canada

Application October 17, 1947, Serial No. 780,533

8 Claims. (Cl. 294—104)

The present invention relates to improvements in implements for serving foods and the like.

The main object of the invention is to provide an improved serving implement comprised of two opposed pivotally connected members used for the purpose of gripping food therebetween.

Another important object resides in the provision of a serving implement of the character described in which the gripping members are pivotally connected in an improved fashion, the lower member being coextensive with the implement handle and the upper member pivotable upward therefrom.

And another object resides in the provision of improved means whereby the movement of one gripping member relative to the other may be controlled by the hand.

Still another object resides in the provision of a serving implement of the character described in which the gripping members are easily separable for washing purposes.

Other objects and advantages will become apparent or be further pointed out in the description to follow.

As an example, and for purposes of illustration only, a preferred embodiment of the invention is shown in the annexed drawing, wherein:

Figure 1 shows a perspective view of the serving implement with the gripping members in closed position;

Figure 2 shows a side view of the serving implement according to the invention being operated by hand in normal fashion;

Figure 3 shows a fragmentary sectional view of the main fork pivotally connecting the two gripping members when the latter are separated;

Figure 4 shows a view similar to Figure 3 with the gripping members in pivotally connected position; and Figure 5 shows a section along the line 5—5 of Figure 4.

Referring now to the drawings, wherein the same reference characters denote corresponding parts throughout, the main or rigid member of the implement is seen to consist of a spoon, the shank of which, 10, extends at one end into suitably shaped handle and, at the other end, is formed into a spoon bowl 12, which latter has its opposite extremities shaped in a protruding flat lip 13.

At the juncture 14 of the shank 10 of the spoon and the handle 11 thereof, both these members are shaped with a deep depression or slot therein and open at the top as best shown to advantage in Figure 5. A pin 15 extends transversely across this slot, being secured at each end to the shank 10 of the spoon.

By means of a projecting block or knuckle 16 on one end thereof, the second gripping member is pivotally connected to the first at the pin 15. For this purpose, the knuckle 16 is made narrow enough to fit into the depression formed in the end of shank 10. A short, upwardly directed, transverse slot 17 is provided in the knuckle 16 whereby the latter may be guided onto the pin 15, and this slot 17 is provided with an enlarged notch 18 at the inner extremity thereof which will rotatably engage the pin when the two members are connected together as shown in Figure 4.

Leading forward from the knuckle 16, the second gripping member is formed successively into a shank 19 similar to shank 10, an open bowl structure 20 disposed opposite to the spoon bowl 12, and a lip-shaped extremity 21 co-operable with the lip 13. When the gripping members are pivoted togther, the lips 13 and 21 will lie against each other, as may the shanks 10 and 19. The open work bowl structure 20 may be of any suitable shape, but is preferably similar to that shown in Figure 1 wherein three longitudinal extending ribs 20 are arranged in space relation and curve to form rounded ribs, two of these ribs being disposed at opposed sides whilst the third is arranged centrally therebetween.

In order that the two gripping members may be manipulated to pivot towards or away from one another at will, a thumb grip 22 is secured to the second gripping member at the outside thereof adjacent the knuckle 16. This grip may be made of a single metal strip and will be bent so that the pivoted member may be manipulated in either direction simply by rocking the pressure of the thumb. To this end, the strip may be secured to knuckle 16 at the outer extremity thereof and bent first upwardly and outwardly towards the handle 11 and then directed in the reverse direction in a sweeping curve which terminates where secured on shank 19 of the second member. The thumb will rest on the long curved part of the grip and will thus be able to rock the second gripping member in either direction around pivot pin 15.

Obviously the embodiment of the invention herein shown and described fulfills the objectives hereinbefore set forth. The implement of the invention consists of two pivotally connected gripping members in which exceedingly simple and easily separable pivot means are employed, and in which the thumb grip type of manipulation gives excellent positive control over the relative position of the two members.

The size and shape of the parts used in the present invention may be adjusted to the particular use for which it is destined, or to the particular amount of play desired between shank 10 and knuckle 16 at the pivot means.

It will be understood therefore that I do not limit myself to the particular embodiment of the invention herein shown and described but various changes may be made as to size, shape and arrangement of parts without departing from the spirit of the invention or the scope of the subjoined claims.

Having thus described my invention, I claim:

1. A serving implement of the character described comprising a pair of co-acting, spoon-like members, a pin pivotally connecting said members, and a thumb-grip rigidly dependent from one of said members and extending above and astride said pin whereby the two members may be positively displaced relative to each other by pressure applied to said thumb-grip.

2. In a serving implement of the character described, a pair of sections pivotally connected by a pin, a spoon bowl formed on one of said sections, a complementary, open-work, cover member formed on the other section in co-acting relation with the bowl, and a thump-grip rigidly secured to one of said members and extending astride said pin whereby the two members may be positively displaced relative to each other by pressure applied to said thumb-grip.

3. In a serving implement, an elongated shank forming a body section, a spoon bowl formed at one end of said body, an auxiliary section connected at one end to said body by a pivot pin, an open-work cover member formed at the free end of the auxiliary section in co-acting relationship with said spoon bowl, and a projecting thumb-grip formed on the auxiliary section at the pivoted end thereof and astride said pivot pin, for the purpose of positively displacing the latter relative to the body section.

4. In a serving implement as claimed in claim 3, a flat lip protruding from the end of each of the spoon bowl and cover members, said lips adapted to co-operate as a food-picking means.

5. In a serving implement, an elongated shank forming a body section, a handle on one end of said shank, a spoon bowl formed on the other end of said shank, said shank having a socket close to the handle, a pivot pin disposed across said socket, an auxiliary shank having a slotted knuckle at one end and an open-work cover member at the other end thereof, said knuckle pivotally and removably securable on said pivot pin whereby the shanks are pivotally connected, said cover member disposed in co-acting relationship with the spoon bowl, and a thumb grip projecting from said knuckle above and astride said pivot pin, whereby the auxiliary shank may be positively opened or closed relative to the other shank by application of pressure on the rear or front end of the thumb-grip.

6. A serving implement of the character described comprising a pair of coacting spoonlike members, a pin pivotally connecting said members, and a thumb-grip rigidly dependent from one of said members and extending above and astride said pin, a handle formed on the other of said members at one end thereof, said thumb-grip comprising a strip extending first upwardly and outwardly towards said handle and bent and directed in the reverse direction away from said handle and terminating on the side of said pin opposite said handle, whereby the two members may be positively displaced relative to one another by pressure applied to said thumb-grip.

7. In a serving implement, an elongated shank forming a body section, a spoon bowl formed at one end of said body, a handle portion formed at the other end of said body section, an auxiliary section connected by a pivot pin at one end thereof to said body intermediate said spoon bowl and said handle portion, an open-work cover member formed at the free end of the auxiliary section in coacting relationship with said spoon bowl, and a projecting thumb-grip formed on the auxiliary section at the pivoted end thereof and astride said pivot pin, for the purpose of positively displacing the latter relative to the body section, said thumb-grip comprising a strip rigidly secured at the outer extremity of the pivoted end of said auxiliary section, said strip bent first upwardly and outwardly toward said handle portion and bent back in the reverse direction towards said open-work cover member and terminating at a point intermediate said pivot pin and said cover member.

8. In a serving implement, an elongated shank forming a body section, a handle on one end of said shank, a spoon bowl formed on the other end of said shank, said shank having a socket close to the handle, a pivot pin disposed across said socket, an auxiliary shank having a slotted knuckle at one end and an open-work cover member at the other end thereof, said knuckle pivotally and removably securable on said pivot pin whereby the shanks are pivotally connected, said cover member disposed in coacting relationship with the spoon bowl, and a thumb grip projecting from said knuckle above and astride said pivot pin and consisting of a strip rigidly secured to said knuckle at the outer extremity thereof, said strip bent first upwardly and outwardly toward said handle and bent back and directed in the reverse direction to extend above said pivot and terminate at a point intermediate the latter and said cover member, whereby the auxiliary shank may be positively opened or closed relative to the other shank by application of pressure on said thumb-grip.

LOUIS ALEXANDRE STE. MARIE.

REFERENCES CITED

The following references are of record in the file of this patent:

UNITED STATES PATENTS

| Number | Name | Date |
| --- | --- | --- |
| 349,394 | Heidt | Sept. 21, 1886 |
| 1,765,974 | Foltis | June 24, 1930 |
| 1,775,571 | Romer | Sept. 9, 1930 |
| 2,280,612 | Andros | Apr. 21, 1942 |
| 2,286,708 | Bair | June 16, 1942 |
| 2,327,367 | Olson | Aug. 24, 1943 |